United States Patent
McNeill et al.

(10) Patent No.: US 6,671,371 B1
(45) Date of Patent: Dec. 30, 2003

(54) ADAPTIVE TRANSMIT AMPLIFIER

(75) Inventors: Iain J McNeill, Aptos, CA (US); Robert M. Khamashta, Los Gatos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 09/385,824

(22) Filed: Aug. 30, 1999

(51) Int. Cl.[7] .............................. H04M 1/00; H04M 9/00
(52) U.S. Cl. ........................... 379/387.01; 379/388.03; 379/390.03; 381/111
(58) Field of Search ...................... 395/395, 387.01, 395/387.02; 381/111, 112, 113, 114, 94.2; 379/388.03, 390.03, 394, 398, 399.01, 419, 424, 428.02

(56) References Cited

U.S. PATENT DOCUMENTS

| | | | | |
|---|---|---|---|---|
| 4,455,453 A | * | 6/1984 | Parasekvakos et al. | 179/2 |
| 5,229,721 A | * | 7/1993 | Stade | 330/265 |
| 5,239,579 A | * | 8/1993 | Schuh | 379/395 |
| 5,396,551 A | * | 3/1995 | Lucey | 379/395 |
| 5,448,646 A | * | 9/1995 | Lucey et al. | 381/74 |
| 5,544,243 A | * | 8/1996 | Papadopoulos | 379/413 |
| 5,623,544 A | * | 4/1997 | Papadopoulos | 379/413 |
| 5,729,603 A | * | 3/1998 | Huddart et al. | 379/387 |
| 5,729,605 A | | 3/1998 | Bobisuthi et al. | 379/430 |
| 5,825,873 A | * | 10/1998 | Duncan et al. | 379/419 |
| 5,838,804 A | * | 11/1998 | Holthaus et al. | 381/111 |
| 5,881,129 A | * | 3/1999 | Chen et al. | 169/30 |
| 5,926,543 A | * | 7/1999 | Lynn et al. | 379/395 |
| 5,937,031 A | * | 8/1999 | Stelman | 379/1 |
| 5,946,392 A | * | 8/1999 | Tague | 379/395 |
| 6,128,384 A | * | 10/2000 | Papadopoulos et al. | 379/413 |
| 6,137,879 A | * | 10/2000 | Papadopoulos et al. | 379/387.01 |
| 6,377,678 B1 | * | 4/2002 | Longwell | 379/387.01 |
| 6,408,069 B1 | * | 6/2002 | Furlong | 379/394 |
| 6,411,098 B1 | * | 6/2002 | Laletin | 324/436 |
| 6,542,757 B2 | * | 4/2003 | Bae | 455/575.2 |

* cited by examiner

*Primary Examiner*—Binh Tieu
(74) *Attorney, Agent, or Firm*—Peter Hsieh

(57) ABSTRACT

An adaptive transmit amplifier for automatically adjusting the transmit output characteristics of a headset adapter output stage includes a detector adapted to detect a value of a bias current in a host microphone transmit circuit. The adaptive transmit amplifier further includes a switching stage coupled to the detector and adapted to select a gain level and impedance level of the headset adapter output stage based upon the bias current value. The adaptive transmit amplifier may further include a logic/timing block coupled to the detector and to the switching stage. The logic/timing block is adapted to control a sequence of detection of the bias current and selection of the gain level and impedance level of the headset adapter output stage. A method of automatically selecting the output characteristics of a headset adapter output stage includes detecting a value of a bias current in a host microphone transmit circuit, and selecting a gain level and impedance level of the headset adapter output stage in response to the value of the bias current.

46 Claims, 7 Drawing Sheets

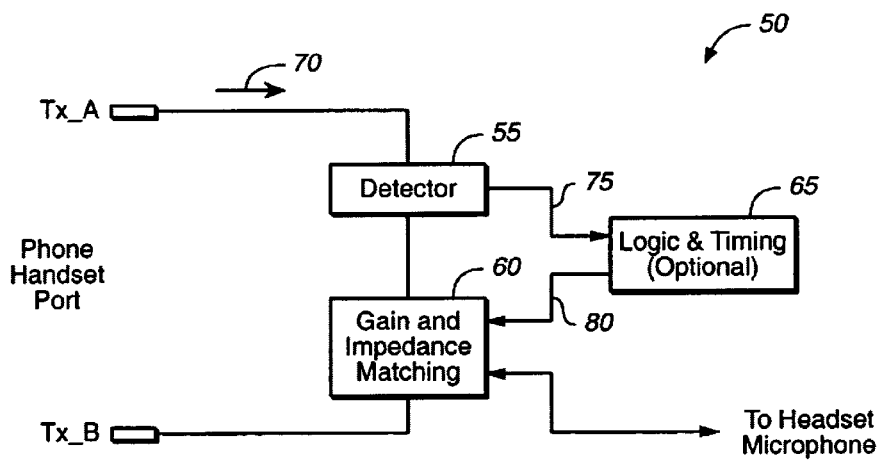
FIG._1
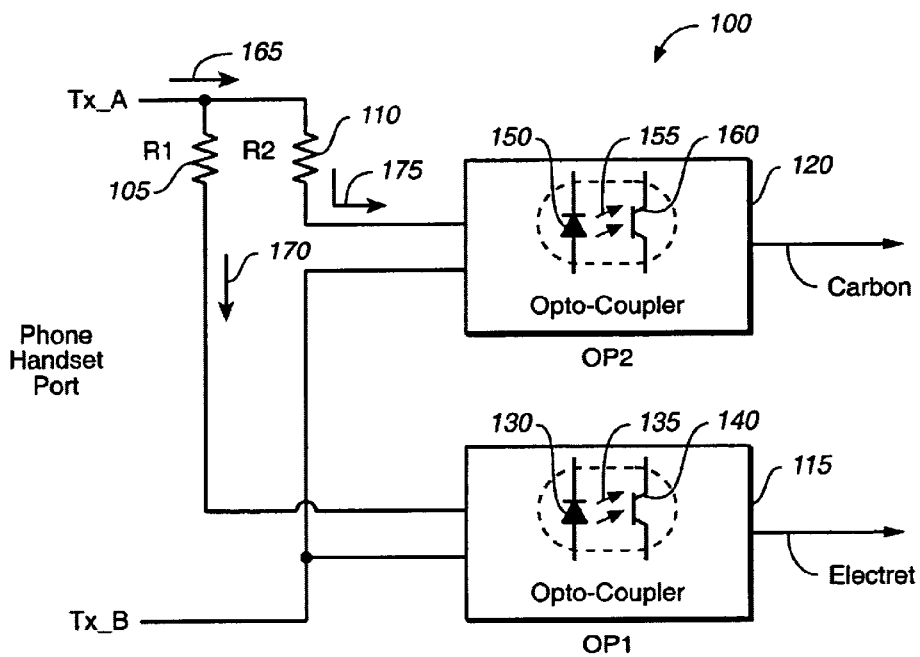
FIG._3

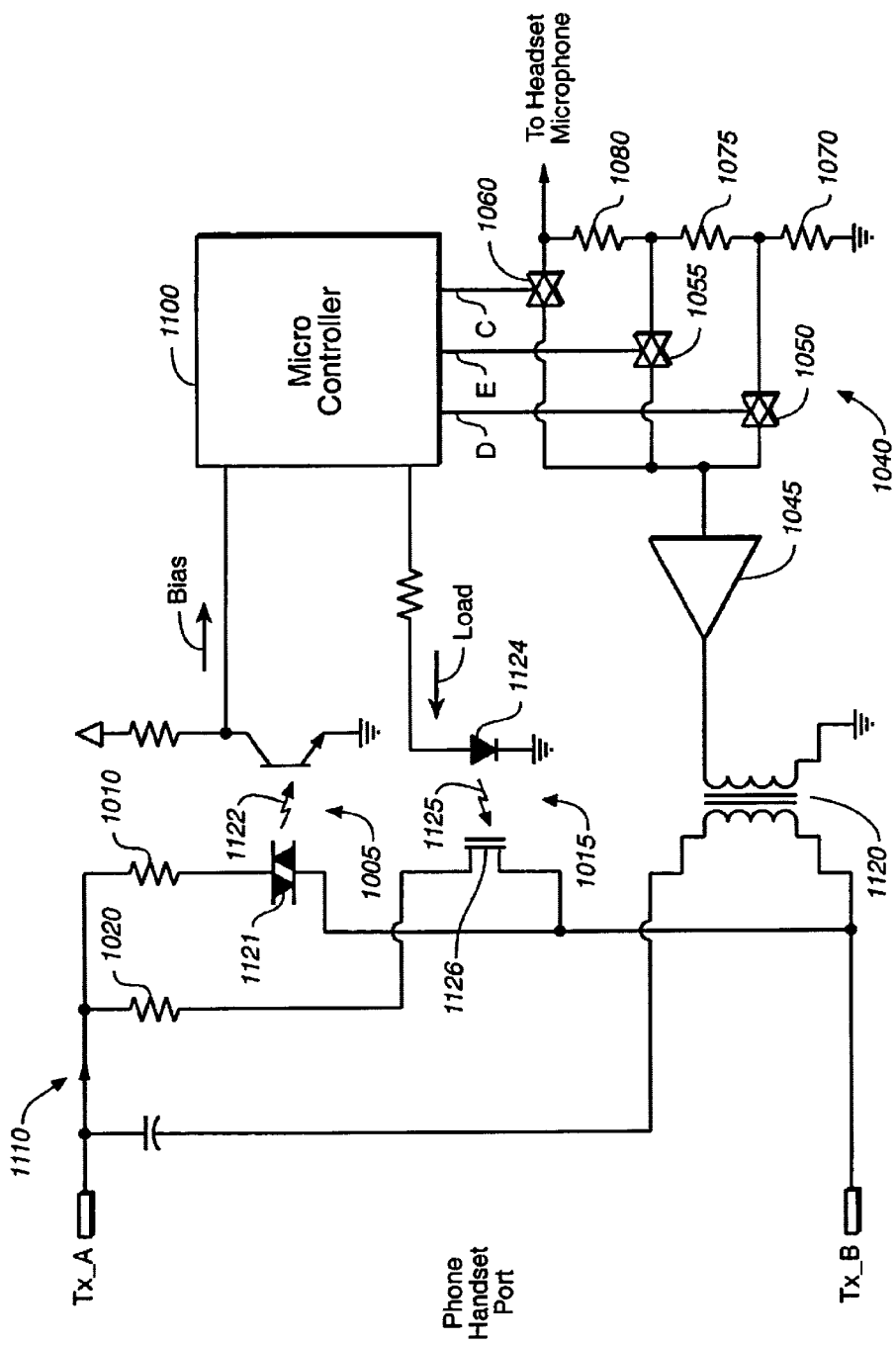
FIG._2

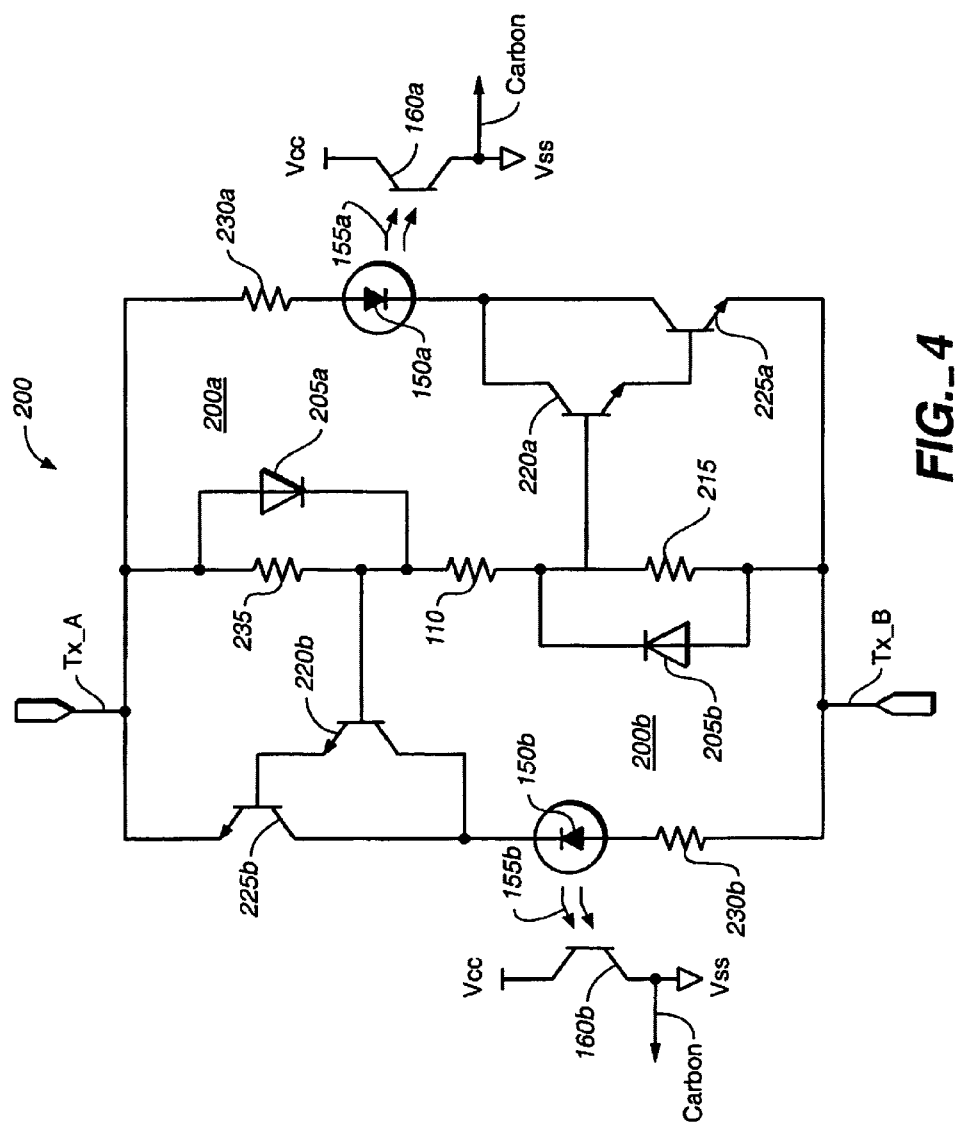
FIG._4

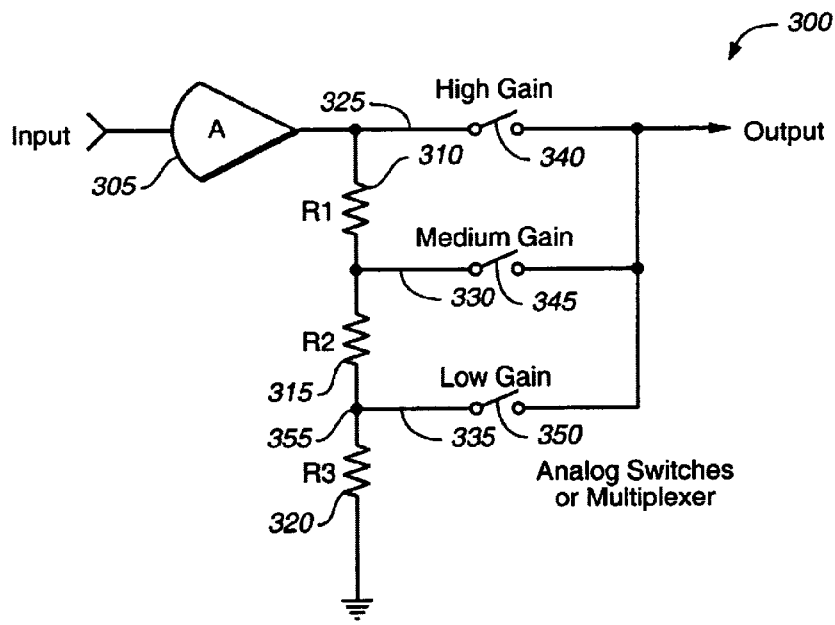
FIG._5A
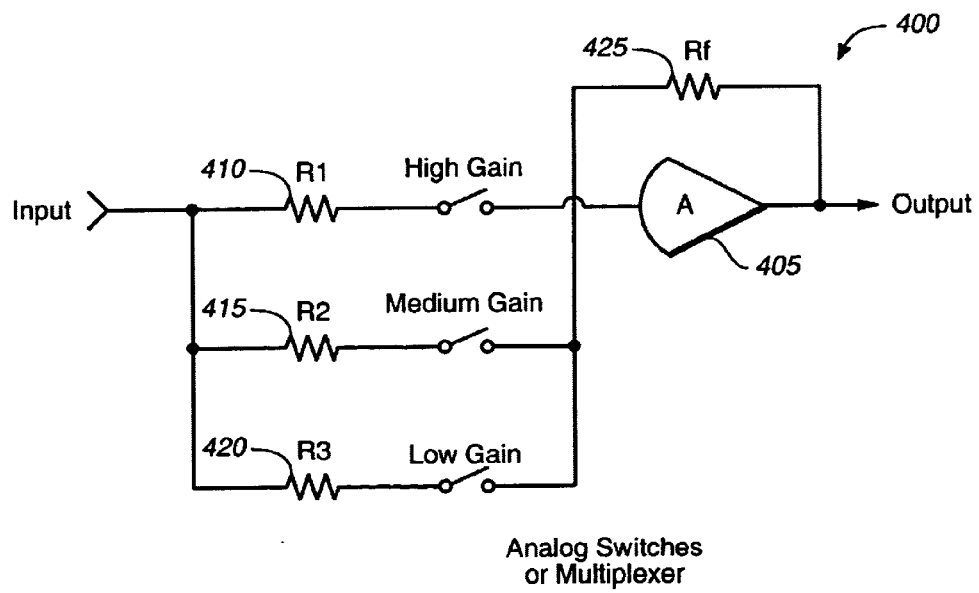
FIG._5B

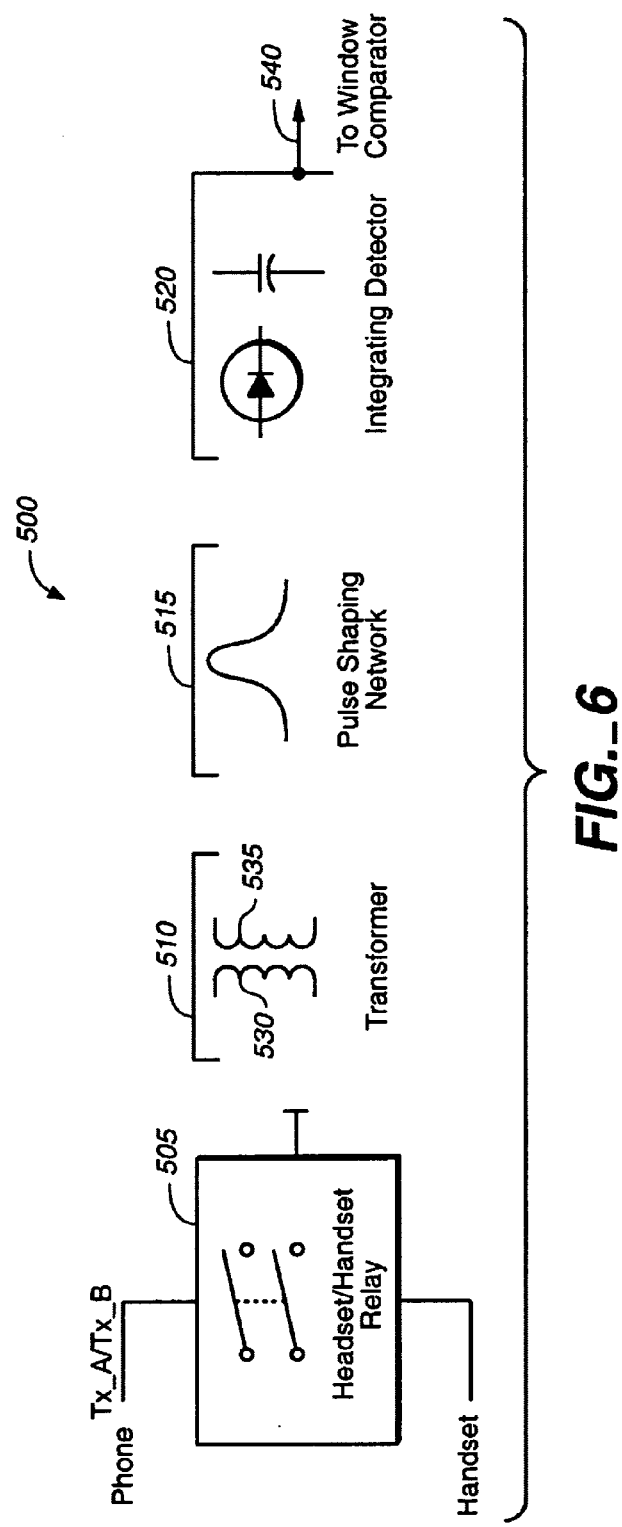
FIG._6

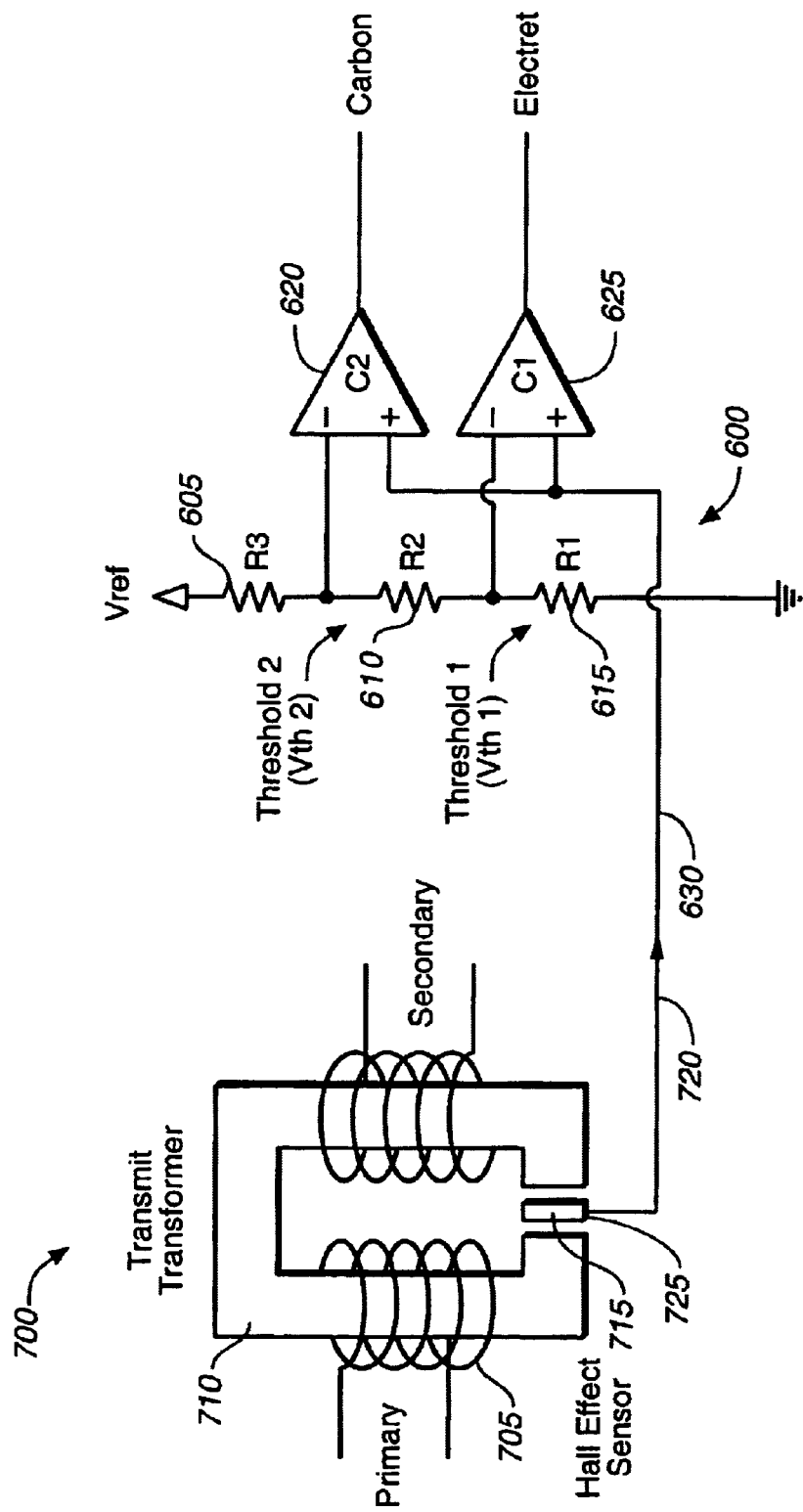
FIG._7

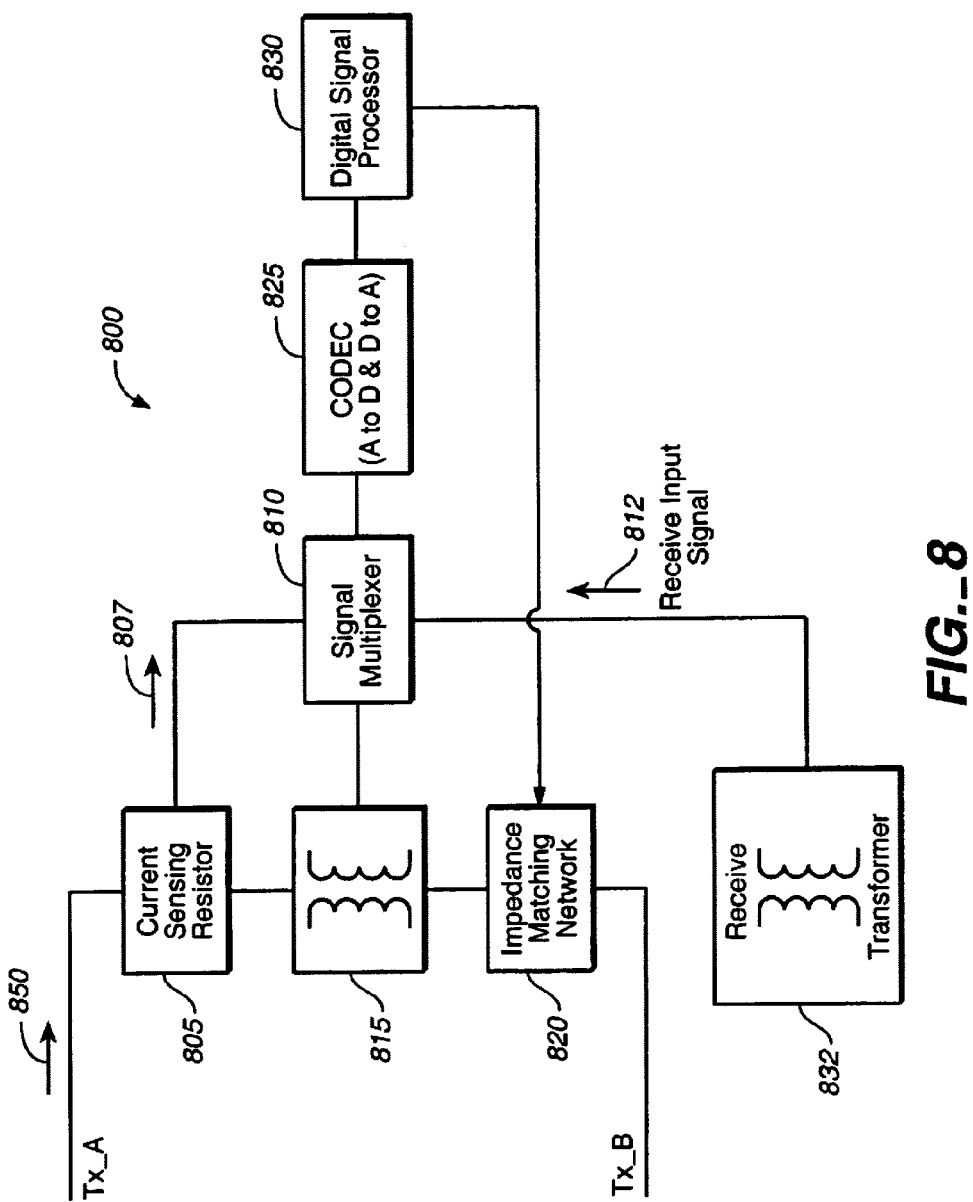
FIG._8

ADAPTIVE TRANSMIT AMPLIFIER

FIELD OF INVENTION

The present invention relates generally to the field of telephone accessories, and more particularly, to the field of signal amplitude adjustment and impedance matching for compatibility with the various telephone handset port interfaces.

BACKGROUND OF THE INVENTION

Conventional telephones usually consist of a telephone body and a corresponding handset. One drawback to such conventional telephones, however, is that the telephone handset prevents the user from using his or her hands for other tasks. For example, it is difficult to use a telephone handset while simultaneously operating a computer keyboard. Accordingly, telephone headsets that perform the same communication functions as telephone handsets are now commonly used. With telephone headsets, a user is free to use his or her hands for other tasks while talking on the microphone that forms part of the headset.

A telephone headset typically requires a headset adapter (i.e., interface unit) to correctly couple the headset to the telephone body. The headset and headset adapter are typically manufactured independently of the handset and telephone body. Additionally, it is desirable for the headset adapter to be compatible with many different telephone bodies and handsets. As a result, the headset adapter must be matched with a specific telephone body and handset. In particular, there is a requirement to match the transmit output characteristics of the headset adapter with those of the host telephone handset-microphone. This matching requirement is due to the many different handset microphone technologies that are presently in use and the need to ensure a connection to the Public Switched Telephone Network (PSTN) is compliant with various national regulations and telephone operating company specifications.

Common handset microphone technologies include carbon, electret, dynamic, piezzo, and moving magnet type acoustic transducers. Each of the above microphone technologies has a different output level and a different output impedance. In order to correctly interface or match a headset adapter to the host phone (without causing imbalance problems such as hum, echo, distortion or poor intelligibility), the output characteristics of the headset adapter and host phone must match. Improper adjustment of transmit level can cause distortion which may introduce out-of-band harmonics which could potentially interfere with network signalling, impacting telco functions such as billing and call progressing.

A significant percentage of headset users incorrectly assume that the headset adapter is properly matched with the host phone after they install the headset and hear the dial tone in the headset receiver. Consequently, a user may not bother to adjust the headset adapter transmit output level and impedance so that there is proper matching between the headset adapter and host telephone. The improperly matched headset adapter and host phone will typically result in the above-mentioned imbalance problems.

Furthermore, many users find the headset (and headset adapter) installation process to be difficult and problematic. For example, the user must perform various difficult installation and testing steps so that the headset is properly installed in the host telephone system. Such difficulties not only impact the productivity of the user, but also impart a negative opinion to the user of the headset/handset unit during the impressionable early periods of use.

Moreover, conventional transmit output level adjustment circuits do not automatically adjust the output impedance level for electret, piezzo, and dynamic handset microphones. Thus, longitudinal imbalance problems are introduced into the phone line via the host phone. These longitudinal imbalance problems cause "hum" and "buzz" noises, echo, radio interference, and other interference that can seriously reduce the intelligibility and productivity of the headset/host-phone system.

Previous solutions for adjusting transmit output characteristics include using manually-operated switches, trim potentiometers, or a combination of both. For example, the M10 headset adapter, which is commercially available from Plantronics, Inc. of Santa Cruz, Calif., requires the user to set the output gain level and output impedance by adjusting a six (6) position slide switch and turning a small trim potentiometer. While the M10 headset adapter primarily provides adjustability for the handset port wiring, the slide switch also permits selection between two output stages. One output stage is for a carbon handset microphone, while another output stage is for the dynamic or electret handset microphone. The transmit level is then adjusted by a separate trim potentiometer.

Another conventional transmit output characteristics adjustment circuit uses a combination of a three (3) position slide switch and a thumbwheel-type potentiometer to adjust the output gain level and output impedance. A disadvantage of this approach is a three-position slide switch limits the number of types of telephone sets that may be compatible with the headset adapter.

Another conventional headset adapter uses a dual in-line package (DIP) switch in conjunction with a screwdriver-adjusted trim potentiometer for adjusting the wiring configuration, output gain level and output impedance. However, the very small size of the DIP switches and trim potentiometer presents difficulties for users and requires the use of special tools when performing the adjustment for the headset adapter.

In yet another conventional approach, the output transmit level is adjusted by use of a slide switch and a computerized customer support system that performs measurements over a phone line and that adjusts the headset adapter remotely. However, this approach disadvantageously requires the user to also perform difficult adjustment steps during the headset installation process and to perform an additional step of calling the customer support system.

The conventional approaches discussed above have proven to be very un-intuitive and have caused difficulties for many customers during the headset installation process. Additionally, a trim potentiometer with sufficient range for matching three different output levels is prone to improper adjustment during installation, thereby resulting in poor performance of the headset/host-phone system. Thus, there is a need for an apparatus and method that eliminates the problems encountered by users during the installation of headsets in various telephone sets with varying microphone technologies.

SUMMARY OF THE INVENTION

The present invention provides an adaptive transmit amplifier that includes a detector and a gain/impedance switching circuit, with the detector either controlling the gain/impedance switching circuit directly or via a logic/timing circuit.

The fundamental blocks of the present invention may take on many forms or topologies, and it is the combination of these blocks applied to solve the problem of correct installation of telephone accessories that is one of the unique features of the invention.

The detector is capable of detecting a bias current value in a transmit circuit of the telephone. The detector is also capable of generating an output signal, and the value of this output signal is determined by the bias current value flowing in the transmit circuit. In one embodiment, the detector comprises, for example, an opto-coupler stage that performs switching functions in response to a bias current value in the transmit circuit of the host telephone. In another embodiment, the detector comprises a Hall Effect detector coupled to the transmit transformer of the headset adapter transmit output stage. In yet another embodiment, the detector comprises a pulse detector including a headset/handset relay, a pulse shaping network, and an integrating detector.

The gain/impedance switching stage preferably includes independent gain and impedance switching circuits, the latter circuit actively used in the detection process to test the output impedance of the host telephone bias circuit. In one embodiment, the gain/impedance switching circuit includes analog switches for selecting the gain level or the impedance level of the adapter transmit output stage. In another embodiment, the gain/impedance switching circuit includes solid-state relays such as opto-FETs (optically coupled field effect transistors) or opto-SCRs (optically coupled silicon controlled rectifiers). In yet another embodiment, the impedance switching stage includes an impedance matching network.

In another embodiment, the fundamental blocks of the invention are controlled by the timing/logic block preferably including, for example, a microcontroller for executing a digital program to coordinate the sequence of impedance switching and bias current detection. In another embodiment, the timing/logic block includes a digital signal processor. In still another embodiment, the timing/logic block includes a window comparator.

Thus, the present invention advantageously provides an adaptive transmit amplifier that automatically adjusts the impedance and gain levels of, for example, a headset adapter transmit output stage so that the headset adapter transmit output characteristics match those of the particular handset microphone technology in the host telephone. In particular, the present invention automatically detects the voltage across (and/or current flowing through) the handset transmit circuit in order to automatically match the output characteristics of the handset transmit circuit and the headset adapter transmit output stage. The invention, therefore, eliminates the problems and complexity encountered by users when installing headsets in host telephone systems. As a result, users of headsets will find the headset adapter installation process to be more intuitive and less time consuming.

These, together with the various ancillary advantages and features which will become apparent to those skilled in the art as the following description proceeds, are attained by these apparatuses and methods, a preferred embodiment thereof shown with reference to the accompanying drawings, by way of example only, wherein:

BRIEF DESCRIPTION OF THE DRAWINGS

FIG. 1 is a top level block diagram of an adaptive transmit amplifier in accordance with an embodiment of the present invention, including a detector, a gain/impedance switching circuit, and a logic/timing block;

FIG. 2 is a schematic circuit diagram of an adaptive transmit amplifier in accordance with a preferred embodiment of the present invention;

FIG. 3 is a schematic block diagram of a detector in accordance with another embodiment of the present invention, wherein the detector includes opto-couplers responsive to a bias current value flowing from a transmit circuit of a host telephone;

FIG. 4 is a schematic circuit diagram of an embodiment of an opto-coupler detector with an integrated impedance switching function;

FIG. 5a is a schematic circuit diagram of an embodiment of a gain switching circuit responsive to the output signal values of a detector in accordance with the present invention;

FIG. 5b is a schematic circuit diagram of another embodiment of a gain switching circuit responsive to the output signal values of a detector in accordance with the present invention;

FIG. 6 is a schematic block diagram of a detector in accordance with another embodiment of the present invention, wherein the detector includes a headset/handset relay for interrupting the flow of bias current conducting from a transmit circuit of a host telephone;

FIG. 7 is a schematic block diagram of a detector coupled to a logic/timing circuit in accordance with another embodiment of the present invention, wherein the detector includes a transformer and a Hall Effect sensor and the logic/timing circuit includes a window comparator; and FIG. 8 is a schematic block diagram of an adaptive transmit amplifier in accordance with another embodiment of the present invention, wherein the adaptive transmit amplifier includes digital signal processing hardware.

DETAILED DESCRIPTION OF THE PREFERRED EMBODIMENTS

Throughout these descriptions references will be made to digital control signals in a positive logic sense where the digital state "active" is synonymous with "high", "1", "+5V", "on", etc. It will be apparent to those skilled in the art that the same logical functions can also be implemented in negative logic where the digital state "active" is synonymous with "low", "0", "gnd", "off", etc.

As a result of extensive research and data collation relating to the interface parameters of many telephones used worldwide, the applicants have discovered that three types of microphone technologies are used in most telephones. These three types of microphone technologies are the carbon granule (i.e., "carbon") microphone, the electret condensor (i.e., "electret") microphone, and the dynamic microphone. As summarized in TABLE 1 below, each type of microphone has unique electronic characteristics that may be used to identify the microphone type. For example, a carbon type microphone requires a relatively high range of bias current (approximately 5.0 to 100.0 milli-amperes) and power requirement (approximately 5.0 to 10.0 DC volts). The carbon type microphone includes a capsule (not shown) filled with carbon granules and a sound-controlled diaphragm (not shown) that compresses the carbon granules, thereby varying the resistance provided by the capsule. The voltage across the capsule will, therefore, vary due to the resistance change occurring across the capsule.

An electret type microphone requires an operating voltage in the range of approximately 1.0 to 10.0 DC volts and a bias current in the range of approximately 10.0 to 500.0 micro-amperes. The electret type microphone includes a capacitor (not shown) having a plate that moves in response to sound waves. As a result, the capacitance of the capacitor changes, since the gap changes between the capacitor plates. The change in capacitance causes the voltage across the capacitor to, therefore, change.

Dynamic type microphones (also known as moving coil) are passive transducers and do not require external power or bias current; they generate current by moving a coil (not shown) through a magnetic field in sympathy with the sound field.

The three microphone technologies mentioned above also have associated electro-acoustic parameters relating to sensitivity and output impedance. Carbon type microphones have sensitivities between approximately −10.0 dBV/Pa (dB Volts per Pascal) to −20.0 dBV/Pa with an output impedance of approximately 50.0 Ohms. Electret type microphones have sensitivities between approximately −30.0 dBV/Pa to −50.0 dBV/Pa with an output impedance of approximately 3300 Ohms. Dynamic type microphones have sensitivities between approximately −60.0 dBV/Pa to −70.0 dBV/Pa with an output impedance of approximately 150 Ohms to 600 Ohms.

TABLE 1

| microphone type | operating voltage | bias current | output impedance | sensitivity |
|---|---|---|---|---|
| carbon | 5.0 to 24.0 volts (DC) | 5.0 to 100.0 milli-amperes | 50.0 ohms | −10.0 to −20.0 dBV/Pa |
| electret | 1.0 to 10.0 volts (DC) | 10.0 to 500.0 micro-amperes | approx. 3300 ohms | −30.0 to −50.0 dBV/Pa |
| dynamic | no voltage requirement | no current requirement | 150.0 ohms to 600.0 ohms | −60.0 to −70 dBV/Pa |

FIG. 1 illustrates a block diagram of an adaptive transmit amplifier 50 in accordance with an embodiment of the present invention. The adaptive transmit amplifier 50 is preferably implemented in a headset system (not shown) and may include a detector 55 coupled to a gain/impedance switching circuit 60 and to a logic/timing block 65. The detector 55 detects a bias current 70 conducting in the host handset microphone transmit circuit (not shown). The gain/impedance switching circuit 60 sets the gain level and impedance level of the headset adapter transmit output stage (not shown). The logic/timing block 65 controls a sequence of detection of the bias current 70 and selection of the gain level and impedance level of the headset adapter transmit output stage. As described below, the detector 55 may be implemented by, for example, an opto-electronic device, a Hall Effect detector, a pulse detector or another equivalent current sensing device. The gain/impedance switching circuit 60 may be implemented by, for example, an analog switch, an opto-FET, an opto-SCR or another equivalent switching device. The logic/timing block 65 may be implemented by, for example, a window comparator, a microcontroller or a digital signal processor, as described below.

As described above with reference to TABLE 1, the microphone type determines the host microphone operating bias current. In FIG. 1, this bias current is represented by current 70. The detector 55 will output a control signal 75 with a value that depends on the current 70 value. Based on the control signal 75 value, the logic/timing block 65 generates a control signal 80 with an appropriate value so that the gain/impedance switching circuit 60 sets a proper gain level and impedance level that matches those of the transmit circuit of the host handset-microphone.

In another embodiment of the present invention, the adaptive transmit amplifier 50 of FIG. 1 may be implemented without the logic/timing block 65. This embodiment requires less components and achieves a relatively lower cost. The detector 55 output is used to directly control the gain/impedance switching circuit 60 to set a proper gain level and impedance level that match those of the transmit circuit of the host handset-microphone.

FIG. 2 illustrates an adaptive transmit amplifier circuit in accordance with a preferred embodiment of the present invention. The components shown in FIG. 2 may be used to implement the blocks shown in FIG. 1. The detector 1005 is sensitive to the current flowing in the host telephone handset port transmit circuit and can accordingly generate an output control signal "BIAS" as input affecting the control of the gain and impedance level of the headset adapter transmit output stage to match the output level and output impedance of the transmit circuit (not shown) of the host microphone (not shown). The detector 1005 relies on the sharp turn-on characteristics of common opto-couplers to perform the detection of the bias current 1110 in the transmit circuit of the host telephone. The resistor 1010 sets the value of the turn-on threshold voltage of the detector 1005.

The impedance switch 1015 and the gain switch 1040 may be used to implement the gain/impedance switching circuit 60 in FIG. 1, while the microcontroller 1100 (FIG. 2) may be used to implement the logic/timing block 65 (FIG. 1). The impedance switch 1015 is a solid-state relay which connects or disconnects a load resistor 1020 depending on the state of a digital control signal "LOAD". When the control signal "LOAD" is active, the load resistor 1020 is connected to the transmit circuit.

The gain switch 1040 includes a resistor divider formed by resistors 1070, 1075 and 1080 which define corresponding proportions ("−20 dB" and "−40 dB") of the input transmit signal amplitude ("0 dB") generated from, for example, an amplifier (not shown) in the headset adapter transmit output stage. Analog switches 1050, 1055 and 1060 (controlled by digital control signals along control lines "D", "E" and "C," respectively) couple one of the transmit signal proportions from the resistor divider to the buffer amplifier 1045 to be driven into the host telephone transmit circuit. When control line "D" is active, the transmit signal proportion "−40 dB" is coupled to the handset port. When control line "E" is active, the transmit signal proportion "−20 dB" is coupled to the handset port. When control line "C" is active, the direct transmit signal "0 dB" is coupled to the handset port. The microcontroller 1100 performs the timing/logic function and determines the type of handset microphone incorporated in the host telephone based on the following procedure.

Initially, the system idles with the digital control signal "LOAD" inactive such that the load resistor 1020 is disconnected and so that all the bias current 1110 flowing in the transmit circuit flows through the detector 1005 (via LED stage 1121). The values of resistors are chosen such that the parallel combination of resistor 1010 and the transmit signal coupling transformer 1120 output impedance is matched to electret and dynamic type microphones, and the parallel combination or resistors 1020, 1010 and the transmit signal coupling transformer 1120 output impedance is matched to carbon type microphones.

Assume, for example, that an electret type microphone is incorporated in the host handset (not shown). The terminals Tx_A and Tx_B will, therefore, be coupled to the electret type microphone. In FIG. 2, the host microphone operating bias current is shown by arrow 1110. As stated above, for an electret type microphone, the operating bias current has a value in the range of approximately 10.0 micro-amperes to approximately 500.0 micro-amperes and this current is sufficient for LED stage 1121 to emit light signal 1122 to turn on the photo-transistor 1123 of detector 1005, thereby driving the control signal "BIAS" active. The microcontroller 1100 detects this active "BIAS" signal and proceeds to drive the impedance control signal "LOAD" active, thus connecting the load resistor 1020 into the transmit circuit and diverting much of the transmit bias current 1110 away from the detector 1005. It is noted that in FIG. 2, the "LOAD" signal permits LED 1124 to emit light signal 1125 to turn on transistor 1126. There is insufficient current through the detector 1005 to drive the control signal "BIAS" active and so the microcontroller 1100 determines that the host telephone has an electret type microphone. The microcontroller 1100 selects the "−20 dB"signal and disconnects the load resistor 1020 from the transmit circuit, thereby restoring the correct output impedance.

As another example, assume that a dynamic type microphone is incorporated in the host handset (not shown). The terminals Tx_A and Tx_B will, therefore, be coupled to the dynamic type microphone. In FIG. 2, the host microphone operating bias current is shown by arrow 1110. As stated above, for a dynamic type microphone, the operating bias current has zero value and this current is insufficient to turn on the photo-transistor 1123 of detector 1005, thereby leaving the control signal "BIAS" inactive. The microcontroller 1100 detects this inactive signal and determines that the host telephone has a dynamic type microphone. The microcontroller 1100 selects the "−40 dB" signal and leaves the load resistor 1020 disconnected from the transmit circuit, thereby maintaining the correct output impedance.

As another example, assume that a carbon type microphone is incorporated in the host handset (not shown). The terminals Tx_A and Tx_B will, therefore, be coupled to the carbon type microphone. In FIG. 2, the host microphone operating bias current is shown by arrow 1110. As stated above, for a carbon type microphone, the operating bias current has a value in the range of approximately 5.0 milli-amperes to approximately 100.0 milli-amperes and this current is sufficient to turn on the photo-transistor 1123 of detector 1005, thereby driving the control signal "BIAS" active. The microcontroller 1100 detects this active signal and proceeds to drive the impedance control signal "LOAD" active, thereby connecting the load resistor 1020 into the transmit circuit and diverting some of the transmit bias current 1110 away from the detector 1005. There is still sufficient current conducting through the detector 1005 to drive the control signal "BIAS" active and so the microcontroller 1100 determines that the host telephone has a carbon type microphone. The microcontroller 1100 selects the "0 dB" signal and leaves the load resistor 1020 connected to the transmit circuit, thereby configuring the correct output impedance.

FIG. 3 illustrates an opto-coupler detector 100 that can be used in an adaptive transmit amplifier in accordance with another embodiment of the present invention. The detector 100 can detect the type of microphone technology that is installed in a handset of a particular host telephone, and can accordingly generate output control signals "CARBON" and "ELECTRET" for adjusting the gain and impedance level of the telephone headset adapter transmit output stage to match the output gain and output impedance of the transmit circuit of the host microphone. The detector 100 relies on the sharp turn-on characteristics of common opto-couplers to perform the detection of the bias current in the transmit circuit of the host telephone. The resistors 105 and 110 set the values of the turn-on threshold voltages of the opto-couplers 115 and 120, respectively. The opto-coupler 115 outputs the ELECTRET signal, while the opto-coupler 120 outputs the CARBON signal, wherein the ELECTRET and CARBON signal values depend on the microphone type of the host telephone and set the output gain and output impedance of the transmit output stage (not shown in FIG. 3) of a headset adapter incorporating the present invention. TABLE 2 indicates that if the ELECTRET and CARBON signals are both "0" in value, then the host telephone microphone type is a dynamic type. If, the ELECTRET signal is "1" and the CARBON signal is "0", the the host telephone microphone is an electret type. If the ELECTRET and CARBON signals are both "1", then the host telephone microphone is a carbon type. Note further that the circuitry in FIG. 3 does not permit a condition to occur wherein the ELECTRET signal is "0" and the CARBON signal is "1".

TABLE 2

| "ELECTRET" signal | "CARBON" signal | host telephone microphone type |
| --- | --- | --- |
| 0 | 0 | dynamic type |
| 1 | 0 | electret type |
| 0 | 1 | not possible (illegal condition) |
| 1 | 1 | carbon type |

The opto-coupler 115 includes a diode 130 that can emit a light signal 135. A light-sensitive transistor 140 is capable of switching on upon receiving the light signal 135. The opto-coupler 120 includes a diode 150 that can emit a light signal 155. A light-sensitive transistor 160 is capable of switching on upon receiving the light signal 155.

Assume, for example, that an electret type microphone is incorporated in the host handset (not shown). The terminals Tx_A and Tx_B will, therefore, be coupled to the electret type microphone biasing circuit of the host telephone. In FIG. 3, the host microphone operating bias current is shown by arrow 165. As stated above, for an electret type microphone, the operating bias current has a value in the range of approximately 10.0 micro-amperes to approximately 500.0 micro-amperes. Therefore, when the bias current 165 is in the range of 10.0 to 500.0 micro-amperes, the values of resistors 105 and 110 are set so that the current 170 is at a sufficient value to turn on the diode 130 and the current 175 does not rise to a value that could turn on the diode 150. Since diode 130 is on, the light 135 is emitted and is focused on the P-N junction of light-sensitive transistor 140, thereby turning on transistor 140. After the light-sensitive transistor 140 turns on, the ELECTRET output signal is pulled to "1" (or high). Since the current 175 is not at a level sufficient to turn on the diode 150, the light-sensitive transistor 160 remains off since the light signal 155 is not emitted by diode 150. As a result, the CARBON signal remains at "0" (or low). Since the ELECTRET signal is "1" and the CARBON signal is "0", the output of opto-coupler detector 100 indicates that an electret-type host microphone is present (see also TABLE 2 above). As discussed below, the values of the CARBON and ELECTRET signals control the output gain and output impedance of the transmit output stage of a headset adapter incorporating the present invention.

As another example, assume that a carbon type microphone is installed in the host handset (not shown). The terminals Tx_A and Tx_B will, therefore, be coupled to the carbon type microphone biasing circuit of the host telephone. As stated above, for a carbon type microphone, the operating bias current has a value in the range of approximately 5.0 milli-amperes to approximately 100.0 milli-amperes. Therefore, when the bias current 165 is in the range of 5.0 to 100.0 milli-amperes, the values of resistors 105 and 110 permit the current 170 to be at a sufficient value to turn on the diode 130 and the current 175 to be at a sufficient value to turn on the diode 150. Since diode 130 is on, the light 135 is emitted and is focused on the P-N junction of light-sensitive transistor 140, thereby turning on transistor 140. After the light-sensitive transistor 140 turns on, the ELECTRET output signal is pulled to "1" (or high). Since diode 150 is on, the light 155 is emitted and is focused on the P-N junction of light-sensitive transistor 160, thereby turning on transistor 160. After the light-sensitive transistor 160 turns on, the CARBON output signal is also pulled to "1" (or high). Since the ELECTRET signal is "1" and the CARBON signal is "1", the output of opto-coupler detector 100 indicates that a carbon-type host microphone is present (see also TABLE 2 above). The values of the ELECTRET and CARBON signals will then set an appropriate output gain and output impedance for the transmit output stage of a headset adapter incorporating the present invention.

As another example, assume that a dynamic type microphone is incorporated in the host handset (not shown). The terminals Tx_A and Tx_B will, therefore, be coupled to the dynamic type microphone input circuit of the host telephone. As stated above, a dynamic type microphone does not require an operating bias current. Therefore, when the bias current 165 has a value of zero, the currents 170 and 175 will also be zero. As a result, the diodes 130 and 150 are not turned on, and the light-sensitive transistors 140 and 160 remain off. Therefore, the ELECTRET and CARBON signals will both have a "0" (or low) value, thereby indicating that a dynamic-type microphone is present (see also TABLE 2 above). The values of the ELECTRET and CARBON signals will then set an appropriate output gain and output impedance for the transmit output stage of a headset adapter incorporating the present invention.

The CARBON and ELECTRET output signals are used as control signals for controlling the gain and impedance settings for a headset adapter transmit output stage, thereby permitting the gain and impedance to be matched between the headset adapter and the host telephone. As described below, FIGS. 5a and 5b illustrate two possible circuits that may be used to select the gain or level for a headset adapter transmit output stage. Alternatively, analog switches and/or opto-FETs or opto-SCRs (as similarly shown in FIG. 2) may be used to control the gain level or impedance level of the adapter transmit output stage, in response to the CARBON and ELECTRET signal values.

It is further noted that the opto-coupler detector 100 of FIG. 3 provides a cost-effective embodiment that provides full detection of the three common telephone handset microphone types (i.e., dynamic, electret and carbon). The opto-coupler detector 100 also provides galvanic isolation between the host telephone and the headset adapter. The outputs of the opto-couplers 115 and 120 are isolated from the telephone network connections of the host phone. As a result, a user of the headset adapter (that incorporates the opto-coupler 100) will not form an electrical connection to the phone line by touching the headset adapter.

The use of complete isolation between the host telephone and the headset adapter system is beneficial for several reasons: it ensures a perfect balance for both transmit and receive circuits to eliminate hum, buzz and echo problems associated with imbalancing the speech networks of common phones; it provides a barrier for leakage currents which can also introduce noise to the phone line; and it also provides additional safety to the user against hazardous voltages that may occur on the phone line.

Reference is now made to FIG. 4 which illustrates an example of a circuit 200 that may be used to implement an opto-coupler detector and impedance matching circuit, in accordance with another embodiment of the present invention. FIG. 4 shows a simplified circuit that only detects CARBON type host phones but integrates the impedance switching function into the detector. This figure illustrates that the essence of the invention can implemented in an architecture that does not rigidly follow the top level block diagram shown in FIG. 1. For example, the circuit 200 may be used to implement the opto-coupler detector 120 for generating the CARBON signal. The polarity of the transmit pins TX_A and TX_B may vary depending on the manufacturer of the phone and the phone company wiring. As a result, some manufacturers set the transmit pin TX_A as positive and the transmit pin TX_B as negative. Other manufacturers set the transmit pin TX_A as negative and the transmit pin TX_B as positive. The circuit 200 includes a pair of identical circuits 200a and 200b that operate based on the polarities of the transmit pins TX_A and TX_B. In one example, assume that the transmit pin TX_A is positive and the transmit pin TX_B is negative. As a result, the diode 205a will allow current to conduct, and the current will flow through the resistors 110 and 215 (resistor 110 is also shown in FIG. 3). If, for example, a carbon type microphone is installed in the host telephone, then at least approximately 5.0 milli-amperes of current are received at TX_A. As a result, a sufficient current amount will flow through resistor 215 to turn on the Darlington pair transistors 220a and 225a. Since the transistors 220a and 225a turn on, the light emitting diode 150a will turn on and emit the light signal 155a. The light-sensitive transistor 160a will turn on after receiving the light signal 155a. Since the light-sensitive transistor 160a is on, it pulls the CARBON output signal to "1" (or VCC). The CARBON output signal may then be used to set the gain level of the headset adapter transmit output stage. Simultaneously, the impedance presented across the transmit wires of the host telephone is matched by the values of resistor 230a and the parallel resistive value set by resistors 110 and 215. The sum of these resistive values is set to approximately 50 ohms which matches the output impedance of an carbon type microphone.

If, on the other hand, less than 5.0 milli-amperes is received at the transmit pin TX_A, then an electret-type microphone is installed in the host telephone. Since the current flowing through resistor 215 will not meet the threshold value for turning on the Darlington pair transistors 220a and 225a, the light emitting diode 155a will not turn on. As a result, the light-sensitive transistor 160a remains off, and the CARBON output signal remains "0" (or at the VSS ground level). Simultaneously, the impedance presented across the transmit wires of the host microphone is matched by the resistance of resistor 110 plus resistor 215. For an electret type microphone, this resistance is approximately 3300 ohms.

If, for example, the transmit pin TX_B is positive and the transmit pin TX_A is negative, then the diode 205b will allow current to conduct, and the current will flow through the resistors 110 and 235. If, for example, a carbon type microphone is installed in the host telephone, then at least approximately 5.0 milli-amperes of current are received at TX_B. As a result, a sufficient current amount will flow through resistor 235 to turn on the Darlington pair transistors 220b and 225b. Since the transistors 220b and 225b turn on, the light emitting diode 150b will turn on and emit the light signal 155b. The light-sensitive transistor 160b will turn on after receiving the light signal 155b. Since the light-sensitive transistor 160b is on, it pulls the CARBON output signal to "1" (or VCC). Simultaneously, the impedance presented across the transmit wires of the host microphone is matched by the values of resistor 230b and the parallel resistive value set by resistors 110 and 235. The sum of these resistive values is set to approximately 50 ohms which matches the output impedance of a carbon type microphone.

If, on the other hand, less than 5.0 milli-amperes is received at the transmit pin TX_B, then an electret-type microphone is installed in the host telephone. Since the current flowing through resistor 235 will not meet the threshold value for turning on the Darlington pair transistors 220b and 225b, the light emitting diode 150b will not turn on. As a result, the light-sensitive transistor 160b remains off, and the CARBON output signal remains "0" (or at the VSS ground level). Simultaneously, the impedance presented across the transmit wires of the host microphone is matched by the resistance of resistor 110 plus resistor 235. For an electret type microphone, this resistance is approximately 3300 ohms.

FIG. 5a is a schematic circuit diagram of another embodiment of a gain switching circuit 300 that can be implemented in the adaptive transmit amplifier of the present invention and that controls the gain level for the transmit output stage of a headset adapter system. An amplifier 305 is used to provide a maximum gain required for the headset adapter system. A resistive divider is formed by resistors 310, 315 and 320 with taps being connected to the resistive divider to provide different output signal levels. In one embodiment, a series of analog switches are used to select the particular voltage divider tap that will connect to the circuit 300 output. As an example, a transistor-based switch 340 controls the flow of a "High Gain" signal along the tap 325 to the circuit 300 output and is responsive to the CARBON signal (see FIG. 3) value. Thus, if the CARBON signal is "1", the transistor-based switch 340 is on, thereby permitting the "High Gain" signal to transmit from amplifier 305 to the circuit 300 output via tap 325. On the other hand, if the CARBON signal is "0", then the transistor-based switch 340 is off, thereby not permitting the "High Gain" signal to transmit along tap 325 to the circuit 300 output.

Similarly, a transistor-based switch 345 controls the flow of a "Medium Gain" signal along the tap 330 to the circuit 300 output and is responsive to the ELECTRET signal (see FIG. 3) value. Thus, if the ELECTRET signal is "1" (and the CARBON signal is "0"), then transistor-based switch 345 is on (and the transistor-based switch 340 along tap 325 is off), thereby permitting the "Medium Gain" signal to transmit along tap 330 to the circuit 300 output.

As another example, if the CARBON and ELECTRET signals are both "0", then the transistor-based switches 340 and 345 are off, thereby not permitting the "High Gain" signal to transmit along tap 325 and not permitting the "Medium Gain" signal to transmit along tap 330. It is noted that the switch 350 (along tap 335) is always closed (or is omitted so that the junction 355 of resistors 315 and 320 are connected by a short circuit path (via tap 335) to the circuit 300 output). In this particular example with the CARBON and ELECTRET signals at a "0" value, the circuit 300 output will be the "Low Gain" signal.

In another alternative embodiment of the circuit 300, a conventional analog multiplexer (not shown) may be used in place of the analog switches 340, 345 and 350. Therefore, the values of the CARBON and ELECTRET signals (see FIG. 3) permit the analog multiplexer to select one of the taps 325, 330, and 335 for connection to the circuit 300 output so that the "High Gain", "Medium Gain" or "Low Gain" signal is generated at the circuit 300 output.

FIG. 5b is a schematic circuit diagram of another embodiment of a gain switching circuit 400 that controls the gain or level for the transmit output stage of a headset adapter system. The gain of an amplifier 405 is adjusted by coupling different input resistors 410, 415, and 420 to the amplifier 405 input. The gain G of the amplifier 405 is defined by equation (1).

$$G=20*\log(R_f/R_{in}) \quad (1)$$

The parameter $R_f$ is the resistance value of the resistor 425, while the parameter $R_{in}$ is the resistance value at the input of amplifier 405. Appropriate selection of the resistors 410, 415, and 420 determines the $R_{in}$ value. The resistors 410, 415 and 420 are coupled to the amplifier 405 input by use of analog switches or by use of an analog multiplexer that are controlled by the values of the CARBON and ELECTRET signals, as similarly described in FIG. 5a.

FIG. 6 is a schematic block diagram of a headset relay switching detector 500 that may be implemented in an adaptive transmit amplifier in accordance with another embodiment of the present invention. The detector 500 includes a headset/handset relay 505, a transformer 510, a pulse shaping network 515, and an integrating detector 520. The headset/handset relay 505 enables the automatic switching between the host telephone handset or the adapter headset. The bias current flowing in the transmit circuit of the host telephone is a DC current. If the relay 505 is cycled between the off and on state, then the bias current is also switched off and on. Therefore, the bias current behaves as if it were an AC signal which can be detected on the transformer primary winding 530. In other words, a pair of opposite polarity impulses are detected on the transformer primary winding 530, and the timing of the impulses are substantially identical to the timing of the relay 505 actuation. The magnitude of these impulses at the transformer primary winding 530 is proportional to the magnitude of the bias current flowing in the transmit circuit of the host telephone.

These impulses at the transformer primary winding 530 are induced as voltage pulses on the transformer secondary winding 535. The pulse shaping network 515 filters the voltage pulses to prevent false detection from pulses or voltage spikes on the phone line or other noise. The pulse shaping network 515 may be implemented by a simple band-pass filter tuned to the natural resonant frequency of the transformer and transmit bias circuit.

The integrating detector 520 provides an output voltage 540 proportional to or dependent on the bias current flowing in the primary winding 530 of the transformer 510. The output voltage 540 is received by a logic/timing block such as a window comparator 600, as shown, for example, in FIG. 7.

The FIG. 6 detector may be used with any of the described impedance/gain switching circuits as described above. FIG. 6 illustrates an alternate embodiment of the detector only.

FIG. 7 is a schematic circuit diagram of a Hall effect detector 700 coupled to a window comparator 600. The Hall effect detector 700 provides full detection capability and galvanic isolation between the host telephone and a headset adapter system by sensing the bias current flowing in the transmit circuit of the host telephone. The bias current flows through the primary winding 705 of a transmit transformer 710 (included in the headset adapter hardware) and generates a constant magnetic flux in the transformer core, with the magnetic flux being proportional to the primary current in the primary winding 705. A Hall Effect integrated circuit sensor 715 (which is fitted in a gap of the transformer core) senses the magnetic flux and generates an output voltage 720 via an output terminal 725. The output voltage 720 is proportional to the magnetic flux in the transformer core. Therefore, the output voltage 720 is proportional to the bias current flowing in the transmit circuit of the host telephone. The window comparator 600 receives the output voltage 720, and generates the ELECTRET and CARBON signal for setting the gain and impedance levels of the headset adapter transmit output stage, as similarly described above. Three voltage windows are define by setting up two threshold voltages (Vyh1 and Vth2) by use of a voltage divider formed by resistors 605, 610, and 615 in the window comparator 600. A stable reference voltage Vref is applied at the top of the resistor 605, and the resistance values of resistors 605, 610 and 615 are chosen for generating the threshold voltages Vyh1 and Vth2. The threshold voltages Vyh1 and Vth2 correspond to transitions between the bias current for the different microphone types.

The comparators 620 and 625 are coupled to an input line 630 which receives the output voltage 720 from the Hall effect sensor 715. The output voltage 720 has a value proportional to a bias current values of a particular microphone type. If the host microphone type is dynamic, then the value of the voltage 720 is "0" or low. As a result, the ELECTRET signal from comparator 625 and the CARBON signal from comparator 620 are both "0" or low.

If an electret type microphone is present in the host telephone, then the value of the voltage 720 will exceed the first threshold voltage Vyh1 (which is received by comparator 625). Since the value of voltage 720 exceeds Vyh1, the comparator 625 will output an ELECTRET signal with a value of "1" (or a high value). Since the value of voltage 720 does not exceed the second threshold voltage Vth2 (which is received by the comparator 620), the comparator 620 continues to output a CARBON signal with a value of "0". As also shown in TABLE 2 above, the "1" value of the ELECTRET signal and the "0" value of the CARBON signal indicate that an electret type microphone is present in the host telephone.

If a carbon type microphone is present in the host telephone, then the value of the voltage 720 will exceed the first threshold voltage Vyh1 and the second threshold voltage Vth2. As a result, the comparator 625 will output an ELECTRET signal with a value of "1" and the comparator 620 will output a CARBON signal with a value of "1". As also shown in TABLE 2 above, the "1" value of the ELECTRET signal and the "1" value of the CARBON signal indicate that a carbon type microphone is present in the host telephone.

As stated above, the CARBON and ELECTRET signals can then be used to control gain and impedance settings for the transmit output stage of the headset adapter system.

FIG. 8 is a schematic block diagram of a detector 800 in accordance with another embodiment of the present invention. The detector 800 is based on digital signal processing (DSP) hardware that forms the basis of the telephone headset adapter. The DSP hardware comprises analog-to-digital converters (ADCs), digital-to-analog converters (DACs), and a digital signal processor, all of which perform the audio functions traditionally performed by analog circuitry. In a telephone headset adapter system that is implemented in a DSP platform, additional analog inputs may be provided to allow measurement of the current flowing in the host telephone transmit circuit.

In the detector 800, a current sensing resistor 805 would generate a voltage 807 proportional to a bias current 850 flowing in the host telephone transmit circuit. A signal multiplexer 810 is used to select between the audio signal 812 from a receive transformer 832 (and perhaps other audio signals) and the voltage 807 from the current sensing resistor 805. The receive transformer 832 is also a component of the headset adapter hardware.

A transmit transformer 815 is the isolation transformer which couples the transmit signal from the headset into the telephone transmit circuit. It also provides galvanic isolation between the headset and the telephone line to offer protection to the user against dangerous fault conditions that may occur e.g., a lightning strike.

The telephone transmit circuit (not shown) provides the bias current 850, as similarly described earlier, to power the microphone (electret or carbon) and this bias current 850 is made to flow through the current sensing resistor 805 thus producing a proportional voltage. The signal multiplexer 810 selects between the receive signal 812 (generated from the receive transformer 832) or the voltage 807 across the current sensing resistor 805, and the selected signal is connected to the analog to digital converter 825 which converts the signals to a digital code for processing. This allows the DSP processor 830 to not only process the receive signal 812, but also monitor the transmit bias current 850 from the host phone using the same analog to digital converter, thus saving cost and component count.

The impedance matching circuit 820 is provided to adjust the headset system transmit output impedance to be the same as the output impedance of the handset microphone that it is replacing.

The ADC 825 converts the voltage 807 to a time series of numbers representing the magnitude of the voltage 807 so that the digital signal processor 830 can receive and process these numbers which represents the transmit bias current value from the microphone. The DSP 830 can then determine the host microphone type by comparing the measured values against those shown in TABLE 1.

The impedance matching network 820 can take the form of either parallel shunts, series networks or a combination of both. Shunt networks have the property of reducing overall impedance, while series networks increase system impedance. These impedance matching networks can be self controlled using some form of feedback mechanism to control the impedance or externally controlled using either an analog control signal (a voltage or current level proportional to the required impedance) or a digital control signal using analog switches or some form of digital to analog converter configured to control impedance.

Passive impedance matching networks include resistors and/or capacitors. Active impedance matching networks include any semiconductor circuit. Intelligent impedance matching networks include any active or passive elements controlled by some form of computer (microcontroller, DSP, CPU).

The purpose of the Impedance Matching Network 820 is to configure the output impedance of the adaptive transmit amplifier to be identical to the impedance of the handset of the host phone that the headset system is replacing. As such, a reasonable approximation is to set about 600Ω for dynamic, about 1000Ω for electret and about 50Ω for carbon type handset microphones.

Output gain switching is achieved using the selectable gain blocks typically included on the digital-to-analog converter portion of the CODEC integrated circuit 825 and/or by mathematical computation on the time series numbers representing the transmit signal. The DSP 830 has control of the CODEC configuration via the digital bus connecting them and so DSP 830 can adjust the gain of the transmit signal accordingly.

Thus, while the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

What is claimed is:

1. An adaptive transmit amplifier for automatically adjusting the transmit output characteristics of a headset adapter output stage, the adaptive transmit amplifier comprising:
    a detector adapted to detect a value of a bias current in a host telephone transmit circuit; and
    a switching stage coupled to the detector and adapted to select a gain level and impedance level of the headset adapter output stage based upon the bias current value.

2. The adaptive transmit amplifier of claim 1 further comprising:
    a logic/timing block coupled to the detector and to the switching stage and adapted to control a sequence of detection of the bias current and selection of the gain level and impedance level of the headset adapter output stage.

3. The adaptive transmit amplifier of claim 2 wherein the logic/timing block comprises a window comparator adapted to generate output control signals responsive to the bias current value.

4. The adaptive transmit amplifier of claim 2 wherein the logic/timing block comprises a microcontroller adapted to generate output control signals responsive to the bias current value.

5. The adaptive transmit amplifier of claim 2 wherein the logic/timing block comprises a digital signal processor adapted to monitor the bias current value and adapted to generate output control signals responsive to the bias current value.

6. The adaptive transmit amplifier of claim 1 wherein the detector comprises an opto-coupler responsive to the bias current value.

7. The adaptive transmit amplifier of claim 6 wherein the opto-coupler comprises:
    a diode adapted to emit a light signal in response to current; and
    a light-sensitive solid-state relay responsive to the light signal emitted from the diode.

8. The adaptive transmit amplifier of claim 1 wherein the detector comprises:
    a headset/handset relay adapted to generate impulse signals by switching of the bias current;
    a transformer coupled to the headset/handset relay and adapted to generate voltage pulses in response to the impulse signals;
    a pulse shaping network coupled to the transformer and adapted to filter the voltage pulses generated by the transformer; and
    an integrated detector coupled to the pulse shaping network and adapted to generate an output control signal dependent on the bias current value.

9. The adaptive transmit amplifier of claim 1 wherein the detector comprises:
    a Hall Effect sensor coupled to a transmit transformer in the headset adapter output stage and adapted to generate an output control signal dependent on the bias current value.

10. The adaptive transmit amplifier of claim 1 wherein the detector comprises:
    a current sensing resistor adapted to generate a voltage signal dependent on the bias current value;
    a multiplexer coupled to the current sensing resistor and adapted to transmit the voltage signal from the current sensing resistor; and
    an analog-to-digital converter coupled to the multiplexer and adapted to convert the voltage signal into a digital code representing the bias current value.

11. The adaptive transit amplifier of claim 1 wherein the switching stage comprises a gain switching stage.

12. The adaptive transmit amplifier of claim 11 wherein the gain switching stage comprises:
    a resistor divider for defining voltage levels based upon an initial voltage level generated in the headset adapter output stage; and
    a plurality of analog switches coupled to the resistor divider and adapted to select a gain level from the resistor divider based upon the bias current value.

13. The adaptive transmit amplifier of claim 1 wherein the switching stage further comprises an impedance switching stage.

14. The adaptive transmit amplifier of claim 13 wherein the impedance switching stage comprises:
    a second diode for emitting a light signal in response to a threshold value of the bias current; and
    a light-sensitive solid-state relay responsive to the light signal emitted from the second diode and adapted to select a load resistor for adjustment of the impedance level of the headset adapter output stage.

15. An adaptive transmit amplifier for automatically adjusting the output characteristics of a headset adapter output stage, the adaptive transmit amplifier comprising:
    a first circuit adapted to receive a bias current conducting in a host telephone transmit circuit, the first circuit including:
        a first diode adapted to conduct the bias current;
        a first resistor stage coupled to the first diode and adapted to receive the bias current conducting through the first diode, the first resistor defining a turn-on voltage level in response to the bias current rising to a defined threshold value;
        a plurality of transistors coupled together in a Darlington pair configuration and coupled to the first resistor stage, and adapted to activate in response to the turn-on voltage level;
        a second diode coupled to the plurality of transistors and adapted to emit a light signal in response to the activation of the plurality of transistors; and
        a light-sensitive solid state relay adapted to generate an output signal for setting an output gain level of the headset adapter output stage in response to the light sign al from the second diode.

16. The adaptive transmit amplifier of claim 15 further comprising:
    a second resistor stage coupled to the second diode, the first and second resistor stages defining an output impedance level of the headset adapter output stage if the bias current is at least equal to the defined threshold value, the first resistor stage defining the output impedance level if the bias current is below the defined threshold value.

17. The adaptive transmit amplifier of claim 15 further comprising:
a second circuit coupled to the first circuit and adapted to receive the bias current in the host telephone transmit circuit and select the output gain level and output impedance level of the headset adapter output stage in response to a value of the bias current.

18. An apparatus for selecting the output characteristics of a headset adapter output stage, the apparatus comprising:
a detector configured to generate an output signal that depends on a value of a bias current conducting in a host telephone transmit circuit; and
a switching stage coupled to the detector and configured to select a transmit output characteristic of the headset adapter output stage in response to the output signal from the detector.

19. The apparatus of claim 18 wherein the transmit output characteristic includes an output gain level of the headset adapter output stage.

20. The apparatus of claim 18 wherein the transmit output characteristic includes an output impedance level of the headset adapter output stage.

21. The apparatus of claim 18 further comprising:
a logic/timing block coupled to the detector and to the switching stage and configured to control a sequence of detection of the bias current and selection of the transmit output characteristic of the headset adapter output stage.

22. The apparatus of claim 21 wherein the logic/timing block comprises a window comparator configured to generate an output control signal responsive to the bias current value.

23. The apparatus of claim 21 wherein the logic/timing block comprises a microcontroller configured to generate an output control signal responsive to the bias current value.

24. The apparatus of claim 21 wherein the logic/timing block comprises a digital signal processor configured to monitor the bias current value and configured to generate an output control signal responsive to the bias current value.

25. The apparatus of claim 18 wherein the detector comprises an opto-coupler responsive to the bias current value.

26. The apparatus of claim 25 wherein the opto-coupler comprises:
a diode configured to emit a light signal in response to current; and
a light-sensitive solid-state relay responsive to the light signal emitted from the diode.

27. The apparatus of claim 18 wherein the detector comprises:
a headset/handset relay configured to generate an impulse signal by switching of the bias current;
a transformer coupled to the headset/handset relay and configured to generate a voltage pulse in response to the impulse signal;
a pulse shaping network coupled to the transformer and configured to filter the voltage pulse generated by the transformer; and
an integrated detector coupled to the pulse shaping network and configured to generate an output control signal dependent on the bias current value.

28. The apparatus of claim 18 wherein the detector comprises:
a Hall Effect sensor coupled to a transmit transformer in the headset adapter output stage and configured to generate an output control signal dependent on the bias current value.

29. The apparatus of claim 18 wherein the detector comprises:
a current sensing resistor configured to generate a voltage signal dependent on the bias current value;
a multiplexer coupled to the current sensing resistor and adapted to transmit the voltage signal from the current sensing resistor; and
an analog-to-digital converter coupled to the multiplexer and adapted to convert the voltage signal into a digital code representing the bias current value.

30. The apparatus of claim 18 wherein the switching stage comprises a gain switching stage.

31. The apparatus of claim 30 wherein the gain switching stage comprises:
a resistor divider for defining voltage levels based upon an initial voltage level generated in the headset adapter output stage; and
a plurality of analog switches coupled to the resistor divider and configured to select a gain level from the resistor divider based upon the bias current value.

32. The apparatus of claim 18 wherein the switching stage further comprises an impedance switching stage.

33. The apparatus of claim 32 wherein the impedance switching stage comprises:
a second diode for emitting a light signal in response to a threshold value of the bias current; and
a light-sensitive solid-state relay responsive to the light signal emitted from the second diode and adapted to select a load resistor for adjustment of the impedance level of the headset adapter output stage.

34. A method of automatically selecting the output characteristics of a headset adapter output stage, the method comprising:
detecting a value of a bias currant in a host telephone transmit circuit; and
selecting a gain level and impedance level of the headset adapter output stage in response to the value of the bias current.

35. An apparatus for selecting the output characteristics of a headset adapter output stage, the adaptive transmit amplifier comprising:
means for detecting a value of a bias current in a host telephone transmit circuit; and
coupled to the detecting means, means for selecting a gain level and impedance level of the headset adapter output stage in response to the value of the bias current.

36. A method of selecting the output characteristics of a headset adapter output stage, the method comprising:
generating an output control signal dependent on a value of a bias current in a host telephone transmit circuit; and
setting an output characteristic of the headset adapter output stage in response to the output control signal.

37. The method of claim 36 wherein the step of setting an output characteristic comprises:
setting an output gain level of the headset adapter in response to the output control signal.

38. The method of claim 36 wherein the step of setting an output characteristic further comprises:

setting an output impedance level of the headset adapter in response to the output control signal.

39. An apparatus for selecting the output characteristics of a headset adapter output stage, the apparatus comprising:

means for generating an output control signal dependent on a value of a bias current in a host telephone transmit circuit; and coupled to the generating means, means for setting an output characteristic of the headset adapter output stage in response to the output control signal.

40. The apparatus of claim 39 wherein the setting means comprises:

means for setting an output gain level of the headset adapter in response to the output control signal.

41. The apparatus of claim 39 wherein the setting means further comprises:

means for setting an output impedance level of the headset adapter in response to the output control signal.

42. An adaptive transmit amplifier for adjusting the transmit output characteristics of a headset adapter output stage, the adaptive transmit amplifier comprising:

a detector configured to detect a value of a bias current in a host telephone transmit circuit; and a switching stage coupled to the detector and configured to select an output characteristic of the headset adapter output stage based upon the bias current value.

43. The apparatus of claim 42 wherein the output characteristic includes an output gain level.

44. The apparatus of claim 42 wherein the output characteristic includes output impedance level.

45. The adaptive transmit amplifier of claim 42 further comprising:

a logic/timing block coupled to the detector and to the switching stage and configured to control a sequence of detection of the bias current and selection of an output characteristic of the headset adapter output stage.

46. A telephone and headset system, comprising:

a host telephone having a host telephone transmit circuit;

a headset having a headset adapter output stage; and an apparatus for selecting a transmit output characteristic of the headset adapter output stage, the apparatus including:

a detector configured to generate an output signal that depends on a value of a bias current conducting in the host telephone transmit circuit, and a switching stage coupled to the detector and configured to select the transmit output characteristic of the headset adapter output stage in response to the output signal from the detector.

* * * * *